(12) United States Patent
Sherlock (10) Patent No.: US 7,447,971 B2
(45) Date of Patent: Nov. 4, 2008

(54) DATA RECOVERY SYSTEMS AND METHODS

(75) Inventor: Derek Alan Sherlock, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 824 days.

(21) Appl. No.: 11/089,578

(22) Filed: May 14, 2004

(65) Prior Publication Data

US 2005/0268149 A1    Dec. 1, 2005

(51) Int. Cl.
*H03M 13/00*    (2006.01)
(52) U.S. Cl. .................. 714/751; 714/758; 714/762
(58) Field of Classification Search ............... 714/751, 714/758, 762, 746, 754, 764; 375/360, 224
See application file for complete search history.

(56) References Cited

U.S. PATENT DOCUMENTS

| | | | |
|---|---|---|---|
| 5,103,465 A | | 4/1992 | Crisler et al. |
| 5,335,250 A | * | 8/1994 | Dent et al. ............... 375/224 |
| 6,438,703 B1 | | 8/2002 | Berning et al. |
| 6,584,163 B1 | * | 6/2003 | Myers et al. .............. 375/360 |
| 2004/0172571 A1 | | 9/2004 | Sherlock |

FOREIGN PATENT DOCUMENTS

WO    WO2004/040836 A1    5/2004

OTHER PUBLICATIONS

U.K. Search Report for Appl. No. GB0509523.7 dated Jul. 21, 2006.
British Patent Office: Patent Search Report for Appl. GB0509523.7; dated Aug. 24, 2005.
Mayank Patel, Fast-160 Presentation, VLSI Technology, Seagate slide presentation, Oct. 12, 1999, pp. 1-17.

* cited by examiner

*Primary Examiner*—Shelly A Chase
*Assistant Examiner*—Fritz Alphonse (57) ABSTRACT

Systems, methodologies, media, and other embodiments associated with data recovery are described. One exemplary system embodiment includes a sampling logic configured to sample data from a data line using a timing reference that is selectable from a plurality of timing reference signals. The system may also include a symbol history logic configured to track a symbol history of the data sampled by the sampling logic and a timing selection logic configured to select the timing reference used to sample the data based on the symbol history of the data to compensate for inter-symbol interference.

24 Claims, 8 Drawing Sheets

| Timing Reference Signals [5:0] | | | | | | Symbol History (Table entry is index of timing reference to use) | | | |
|---|---|---|---|---|---|---|---|---|---|
| | | | | | | 00 | 01 | 10 | 11 |
| A → 0 | 1 | 0 | 1 | 0 | 1 | 5 | 2 | 3 | 4 |
| B → 1 | 0 | 1 | 0 | 0 | 1 | 1 | 3 | 2 | 0 |
| C → 1 | 0 | 0 | 1 | 1 | 0 | 4 | 2 | 3 | 5 |
| D → 0 | 1 | 1 | 0 | 1 | 0 | 0 | 3 | 2 | 1 |

Line 5 — Line 0
Line 4 — Line 1
Line 3 — Line 2

DATA RECOVERY SYSTEMS AND METHODS

BACKGROUND

Using a parallel electrical bus, digital signals that represent symbols can be propagated between drivers and receivers. A symbol, as discussed herein, represents a single unit of data, representing a binary 0 or 1 that is transmitted on a single wire on a bus. In a source-synchronous clocking configuration, each symbol is also accompanied by a source-synchronous clock or strobe that is transmitted on a separate wire. The clock or strobe provides a timing reference to the receiver for sampling the symbol value. In prior systems, a single clock or strobe provides a timing reference for many data wires on the parallel bus. The receiver must sample a value of the data from the bus during a timing eye, which is a period when the data is known to be valid. The timing relationship between the timing eye and the received strobe or clock may be adversely affected by factors that degrade signal integrity. For example, factors may include reflections resulting from mis-termination or stubs, over-dampening resulting from weak drivers, weak or delayed signal drive resulting from simultaneous switching of multiple drivers, and the like. Degradation of this timing relationship may reduce the reliability of the bus or may lower the achievable performance by forcing a chip designer to adopt a lower symbol rate in order to widen the timing eye.

The term "inter-symbol interference" applies to a specific subset of factors that degrade signal integrity. It applies to factors that are correlated with the history of symbols recently carried on the same bus line. For example, on an over-damped bus, a wire that switches from a low value to a high value at the beginning of a symbol interval, may not reach as high a signal level by the beginning of the next signal interval, as compared to a second wire that has been continuously high all along. If both wires subsequently transition to a low value, the wire that has been continuously high will be further from its switching threshold than the wire that has only recently switched to the high value. If the wires have similar slew rates, the latter will be seen to switch low earlier than the former. More complicated inter-symbol interference patterns can occur if the bus topology contains stubs or mis-terminations such that energy from one switching transition is still present in the form of a reflection two or even more symbol intervals later.

One technique that has been used to compensate for inter-symbol interference is known as driver pre-compensation. In this technique, a circuit driving each line of a data bus keeps track of the symbol history of each line. Based upon the history of the prior symbols driven, the circuit varies some characteristic of the driver, such as the drive strength, edge rate, or possibly timing of switching. The variation is done in such a way as to compensate the timing of the symbol's timing eye as it is expected to be seen by the receiver such that the relative timing of the signal eye and the clock or strobe is closer to nominal than it would be without pre-compensation. Correct implementation and use of pre-compensation requires careful modeling of the driver, the transmission line, and the receiver to accurately predict the effect of symbol history on the signal timing eye.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

One example of the present systems and methods can be generally described as follows. A data signal can be recovered from a data bus using a receiving device. For each data symbol received by the receiving device, a symbol history can be tracked, up to a chosen depth. In each symbol interval, the receiving device can include logic to dynamically select one of a plurality of timing reference signals to act as a timing reference for sampling the data signal in the next symbol interval. The selected timing reference signal can be one that has the identical symbol history to the data signal being sampled, and is expected to transition in the next symbol interval. The transition in the next symbol interval acts as a timing reference (clock edge or latch closure) for sampling the data.

In one aspect, the below described examples can be configured to dynamically derive timing from actual in-circuit behavior of a reference signal that carries the identical symbol sequence as the data being sampled. Since the data and clock (e.g. the timing reference signal) both have the same selected symbol sequence, both signals should incur identical inter-symbol interference effects. As such, their relative timing will be unaltered by the inter-symbol interference, and thus, the interference is compensated.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Data store", as used herein, refers to a physical and/or logical entity that can store data. A data store may be, for example, a database, a table, a file, a list, a queue, a heap, a memory, a register, a buffer, and so on. A data store may reside in one logical and/or physical entity and/or may be distributed between two or more logical and/or physical entities.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected. A "symbol" will represent a binary 1 or 0 bit and will also be referred to as one signal.

Some portions of the detailed descriptions that follow are presented in terms of algorithms and symbolic representations of operations on data symbols. These algorithmic descriptions and representations are the means used by those skilled in the art to convey the substance of their work to others. An algorithm is here, and generally, conceived to be a sequence or group of operations that produce a result. The operations may include physical manipulations of physical quantities. Usually, though not necessarily, the physical quantities take the form of electrical or magnetic signals capable of being read, stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like selecting, sampling, processing, determining, obtaining, computing, or the like, refer to actions and processes of a computer system, logic, processor, or similar electronic device that manipulates and transforms data represented as physical (electronic) quantities.

Figure 1:
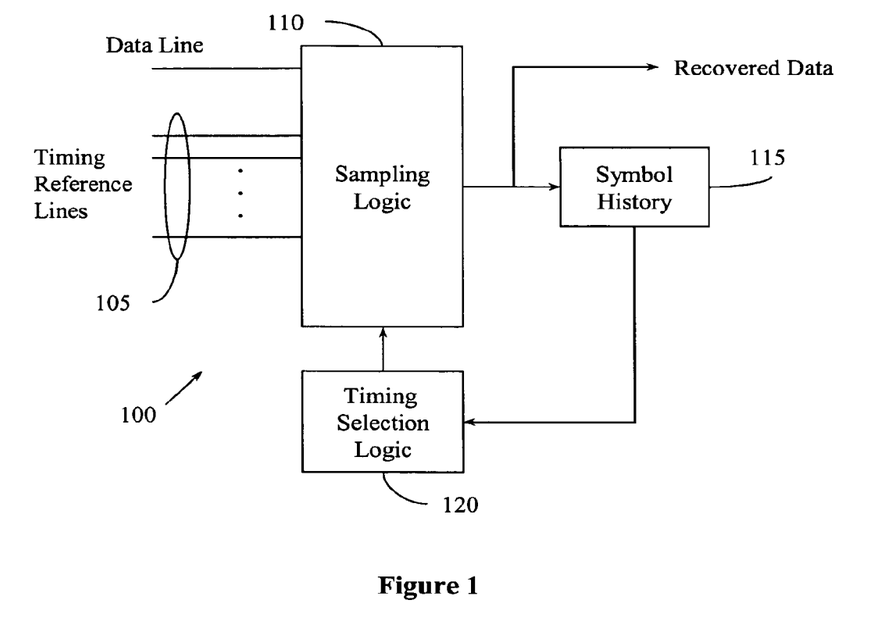
FIG. 1 illustrates an example data recovery system.

Illustrated in FIG. 1 is one example of a data recovery system 100 that is configured to sample and recover data from a data line and may compensate for inter-symbol interference. In one example, the data recovery system 100 can be implemented at a receiving side of a parallel data bus where the data line includes a set of associated timing reference lines 105 that can be selected and used as a clock for sampling data from the data line. Throughout the disclosure, the term "symbol" will be used to represent one unit of data such as a binary "1" or "0". In one example, a parallel bus can include multiple data lines and the data recovery system 100 can be repeated for each data line. The data recovery system 100 is configured to provide a way of compensating for changes in the timing of signals on the data line that are correlated with the history of the symbols that were sent on the data line. By selecting an appropriate timing reference line 105 to be used as a clocking signal for sampling the data line, the system 100 can compensate for inter-symbol interference.

For example, the data recovery system 100 can include a sampling logic 110 configured to sample data from the data line using a timing reference that is selectable from the timing reference lines 105. A symbol history logic 115 can be configured to track a symbol history of the data that is sampled by the sampling logic 110. The symbol history can be a desired symbol depth such that it stores a history of one, two, three, or more symbols that are sampled from the data line. The symbol history logic 115 can be a shift register or other type of data store.

A timing selection logic 120 can be configured to dynamically select the timing reference used to sample the data based on the symbol history 115 of the data. The data or symbol that is sampled from the data line using the selected timing reference line becomes the recovered data that can be transmitted to downstream circuitry or logic. The sampled data is moved into the symbol history 115 and the process repeats for the next symbol received on the data line.

In one example of the timing reference lines 105, the system can include a number of timing reference lines that are based on the depth of the symbol history 115 being tracked. Each timing reference line can be configured to carry a pre-determined symbol pattern that is repeated. For example, a driving circuit (not shown), which transmits signals on the data line to the data recovery system 100, can be configured to generate a pre-determined symbol pattern for each timing reference line 105 and transmit the pattern along with data on the data line. A suitable sequence for the pattern can be derived to cover possibilities of symbol histories based on the amount of history tracked. The timing selection logic 120 can then be configured with a lookup table, state machine, or other logic to associate symbol histories with one of the timing reference lines 105. Thus, when a symbol is received on the data line, the timing selection logic 110 selects one of the timing reference lines 105 that is associated with the current symbol history 115. The recovered data is obtained from sampling the data line using the selected timing reference line. Example configurations of the timing reference lines 105 will be described in greater detail with reference to FIG. 3.

Figure 2:
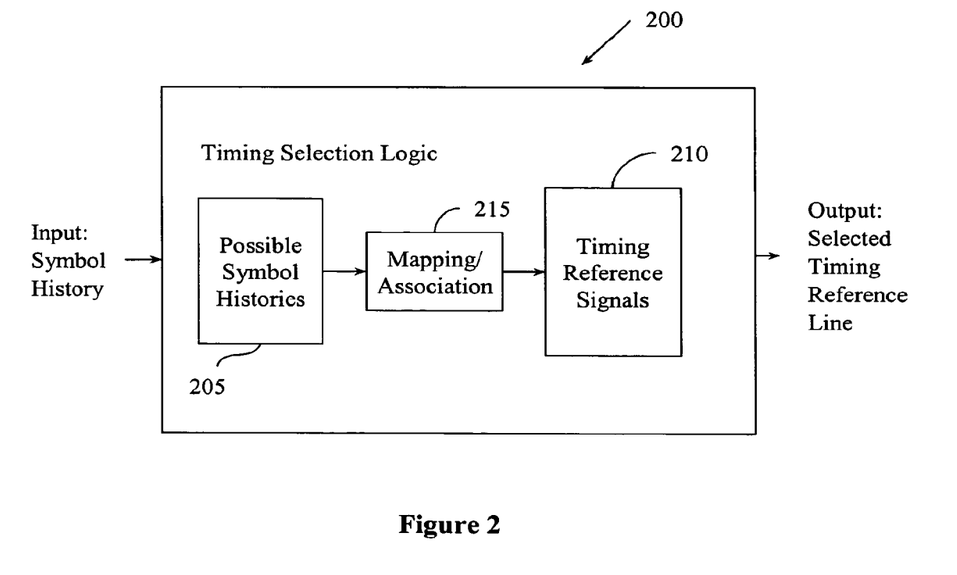
FIG. 2 illustrates one example of a timing selection logic that associates symbol histories with timing reference signals.

Illustrated in FIG. 2 is an example timing selection logic 200 that is configured to associate possible symbol histories 205 to a timing reference signal 210 from a set of timing reference signals. The association can be implemented using a mapping 215 that, based on an inputted symbol history, outputs a selected timing reference line to be used as a clock signal to sample the data. For example, the timing selection logic 200 can generate a signal that is used to control the sampling logic 110 in FIG. 1 based on the selected timing reference line. The mapping 215 can be, for example, a lookup table like the example lookup table 300 shown in FIG. 3. The mapping 215 can be implemented as a circuit or other logic that is configured to output a signal that represents a selected timing reference line in response to an inputted symbol history.

Figure 3:
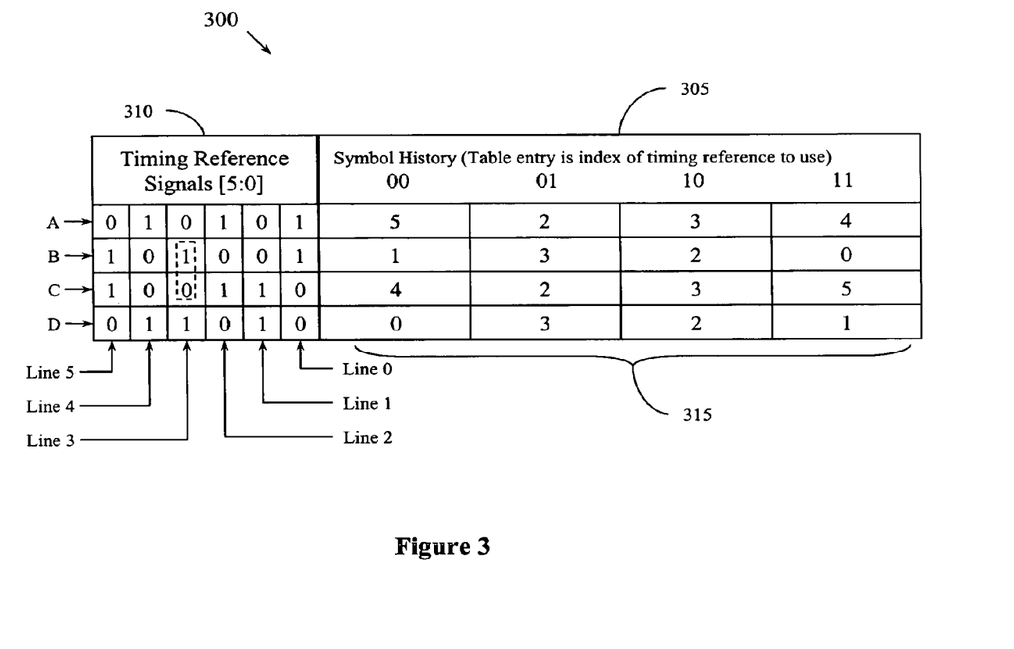
FIG. 3 illustrates an example lookup table.

Illustrated in FIG. 3 is an example lookup table 300 that maps or otherwise associates symbol histories 305 with timing reference signals 310. For example, the association identifies which timing reference signal is suitable as a clock to sample a currently received symbol in order to compensate for inter-symbol interference. The lookup table 300 is configured with a symbol history depth of 2 symbols so that there are four possible symbol histories (e.g. 00, 01, 10, 11). Each possible symbol history is shown as one column in the table 300. It will be appreciated that other symbol history depths can be used such as 1, 3, or more.

When designing the lookup table 300 and thus the mapping function 215 of the timing selection logic 200, the number of symbols to be tracked in the history is first decided. The number of tracked symbols will influence the number of timing reference signal lines to be used and also a symbol pattern that is transmitted on each timing reference signal. The predetermined patterns for the timing reference signals are determined, for example, to provide a suitable sequence of symbols to represent the possible symbol histories and to provide rising and falling edges in the pattern sequence. A rising or falling edge in the pattern represents a transition (e.g. 0 to 1, or 1 to 0) that can be used as a clocking signal.

Based on a 2-symbol depth, the example lookup table 300 includes six reference lines labeled 5-0. It will be noted that the lines 5-0 and the symbol histories patterns are read from their right side to left side. This is not an implementation limitation but simply is for purposes of explanation. Each reference line 5-0 includes a predetermined symbol pattern that contains four symbols that are shown vertically. For example, the symbol pattern for reference line 0 is "1100". The symbol pattern for reference line 1 is "0011". The symbol pattern for reference line 2 is "1010" and so on.

Each row (e.g. A-D) of the timing reference signals 310 represents the symbol pattern on all reference lines 5-0 at one instance of time or symbol interval. On the next symbol interval, the timing reference lines 5-0 would carry a symbol pattern shown in the next subsequent row. For example, in a first symbol interval shown in row A, reference lines 5-0 carry the symbol pattern "010101". On the next symbol interval shown in row B, the timing reference lines carry the pattern "101001" and so on. Since each timing reference line carries a sequence of four symbols, the sequence is repeated after each four symbol intervals. Thus, on the fourth symbol interval shown as row D, the symbol patterns would repeat and start with the pattern at row A on the next symbol interval. As previously described, these example symbol patterns can be generated and transmitted by a driver/transmitter that is on the driving side of a parallel bus.

In one example, the predetermined symbol patterns for the timing reference lines 5-0 can be generated and grouped together in a manner where at any given symbol interval A-D, there exists a reference line that has a symbol history (e.g. a current symbol and a previous symbol for a 2 symbol history) that matches the symbol history of the sampled data. Additionally, the next symbol in the pattern of the reference line should be a transition (e.g. a symbol change) so that it can serve as a clocking signal.

Once the possible symbol histories 305 are determined and the symbol patterns for the timing reference lines are determined, a mapping or association can be determined. The association is referenced by entries 315 For example, the entry at an intersection of a row and a column identifies which timing reference line has an identical symbol history to the data received and is about to transition its symbol pattern, thus, providing an edge to use for a timing reference.

As previously explained, the sequence of the four symbol intervals A-D is repeated continuously. The mapping between the symbol history 305 to the timing reference signals 310 is based on which symbol interval A-D is current in the sequence. Thus in one example, a signal that indicates the current symbol interval in the sequence of the timing reference signals 310 can be provided to or generated by the timing selection logic 200 or by a separate logic that operates with the system 100. This signal can be received from the transmitting side of the bus and/or the receiving side can track the sequence using a sequence counter.

Looking to the mapping 315 of the table 300, suppose a data line has a symbol history of "10" meaning that the current symbol is a 0 and the previous symbol is a 1 (e.g. reading it from right to left). Further suppose that the sequence of the timing reference signals 310 is in symbol interval C. At symbol interval C, the six timing reference signals contain the symbols "100110". To associate the symbol history of "10" to one of the timing reference lines 5-0, a selected reference line is one that has the same symbol history of "10" and has a changing symbol on the next symbol interval. Thus, for the symbol history of "10" and for the symbol interval C, the mapping 315 indicates reference line number "3" is the appropriate timing reference line to use to sample the current data on a data line.

Looking at the pattern of reference line 3 in data interval C, it includes a current symbol of "0" and a previous symbol of "1" (in data interval B). This pattern is shown in the dashed outline and matches the present symbol history of "10". Additionally, reference line 3 has a symbol change or transition in the next interval (e.g. symbol interval D) where the pattern in reference line 3 changes from a "0" to a "1" from symbol interval C to interval D. Mappings for the other symbol histories can be performed and determined in a similar manner. For example, when using the mapping 315, if a symbol history is "00" and the timing reference signals 310 are in symbol interval B, the mapping 315 indicates that timing reference line "1" is to be used to sample the current data on the data line. It will be appreciated that the determination of symbol patterns for the timing reference lines 5-0 and the associations to symbol histories in mapping 315 can be performed, for example, when a chip or circuit is being designed.

Figure 4:
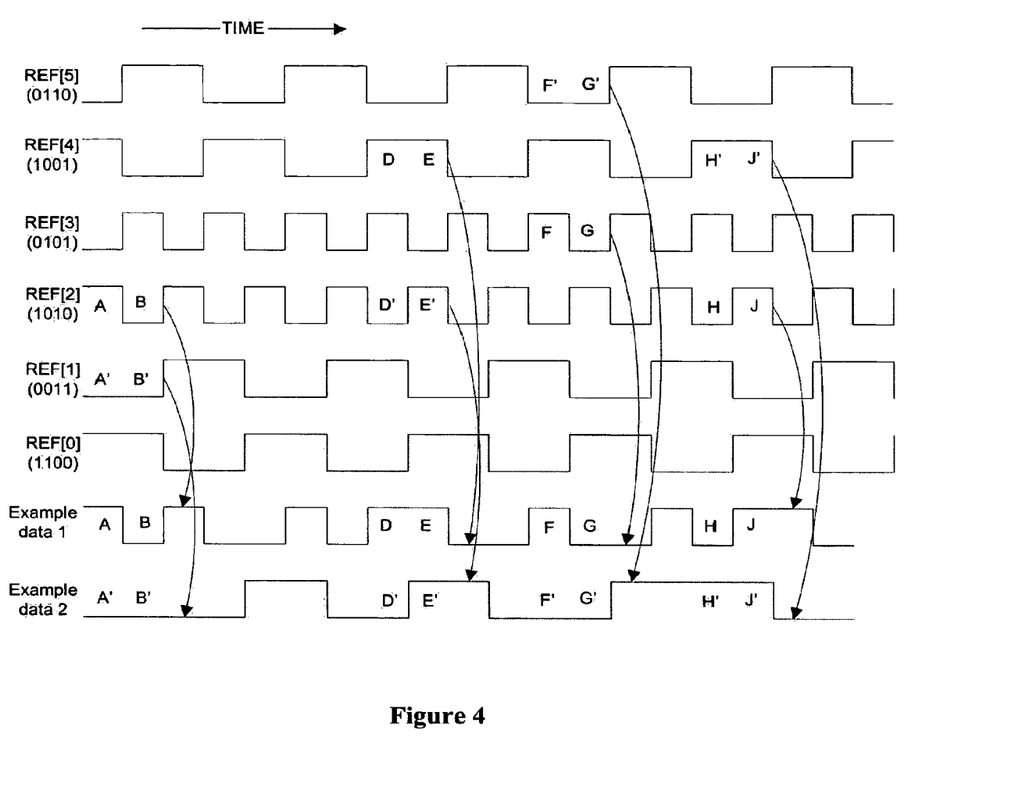
FIG. 4 illustrates example timing diagrams and signal patterns for example timing reference lines.

Illustrated on FIG. 4 is an example timing diagram that represents six timing reference lines and their respective symbol patterns identified as REF[0] to REF[5]. For example, reference line 1 (REF[1]) carries a pattern of "0011" that is repeated. The symbol patterns shown in FIG. 4 also match the symbol patterns shown in the lookup table 300 corresponding to the timing reference lines 0-5. Also illustrated are two example data signals, data 1 and data 2. At various points in time, FIG. 4 shows a mapping or association between a signal on one of the data lines 1 or 2 and a selected timing reference line that is to be used to sample a signal.

The following is an example association shown in FIG. 4. If a current symbol on data I is at point B, (which shows a previous symbol of A), the association looks for a timing reference line that has the same symbol history AB and has a transition or changing symbol in the next symbol interval. Thus if the symbol at point B is low (e.g. 0), then the next symbol should be high (e.g. 1) if the reference line is to serve as a clock source. The reference line that matches this criteria is reference line 2 (REF[2]) and reference line 2 would be used to recover the data from data 1. Referring to example data 2, at symbol B', the timing reference line that matches the criteria is reference line 1 (REF[1]). Other example associations are shown at other points in time in FIG. 4 which will be understood using the previous examples.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

Figure 5:
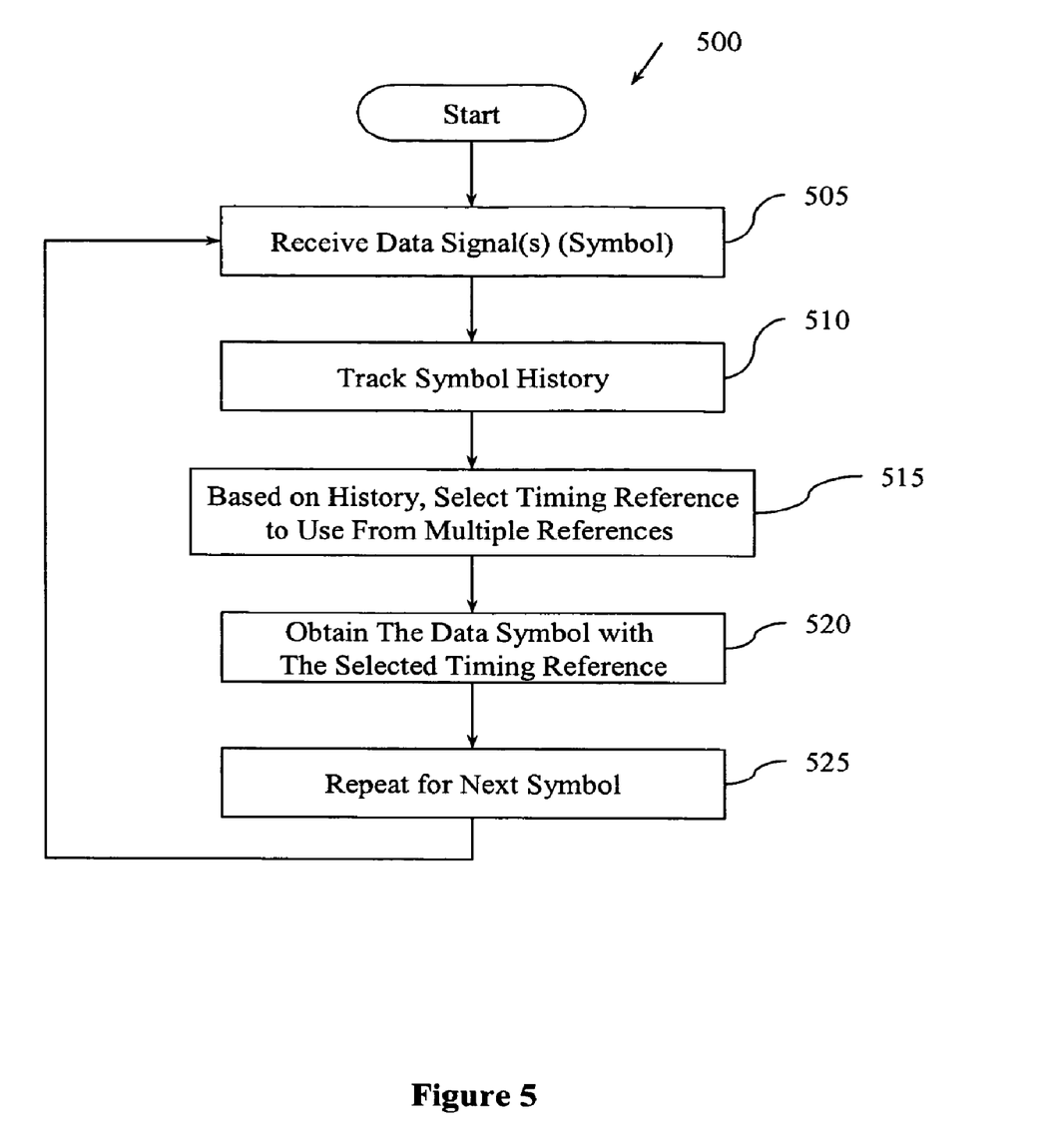
FIG. 5 illustrates an example methodology associated with obtaining data based on a symbol history and using a selected timing reference.

Illustrated in FIG. 5 is an example methodology 500 that can be associated with recovering data signals based on symbol history. The illustrated elements denote "processing blocks" that may be implemented in logic. In one example, the processing blocks may represent functions and/or actions performed by functionally equivalent circuits such as an analog circuit, an application specific integrated circuit (ASIC), or other logic device. The diagram of FIG. 5, as well as the other illustrated diagrams, are not intended to limit the implementation of the described examples. Rather, the diagrams illustrate functional information one skilled in the art could use to design/fabricate digital circuits or other logic device to perform the illustrated processing.

With reference to FIG. 5, the methodology 500 can be used, for example, in a data recovery system that receives data from a data bus. The methodology 500 can also be used, for example, in chip-to-chip communications, logic-to-logic communications, or communications between other types of devices that may be in an electronic device such as a computer, cell phone, camera, integrated circuit, scanner, image forming device, and other devices that process digital signals.

The methodology 500 may begin when a data signal (e.g. a symbol) is received (block 505). The process may also include tracking a symbol history of the data symbols received (block 510). The number of symbols to be tracked can be predetermined so that one, two, three or more symbols can be stored. Based on the symbol history, a timing reference signal is selected from multiple timing reference signals (block 515). The selection can be based on, for example, a correlation between the symbol history of the data signal received and a symbol pattern of the timing reference signals. As previously explained, a matching condition can be where a timing reference signal contains a matching symbol pattern as the symbol history and where the symbol pattern has a clock edge or transition as the next symbol in the symbol pattern. The data symbol is then obtained using the selected timing reference (block 520) and the process is repeated for the next symbol interval for the next symbol on the data line (block 525).

Regarding the obtaining block 520, the process can include concurrently sampling the data signal using each of the multiple timing reference signals to obtain a set of sampled data. Then, based on the selected timing reference signal from block 515, one sampled data can be selected from the set of sampled data and the selected sampled data becomes the obtained data signal. In another example, the received data signal can be sampled using only the selected timing reference signal after the reference signal is selected. In another example, in either the concurrent sampling or single sampling examples, the methodology can recover one symbol from the data signal using the selected timing reference signal and perform the selecting step for each new symbol received on the data signal line. In another example, the selecting block 515 can further include using a lookup table that is configured with the correlation/association between possible symbol histories and the timing reference signals. The correlation can be defined using previous examples described with reference to FIG. 3 and the lookup table 300.

Figure 6:
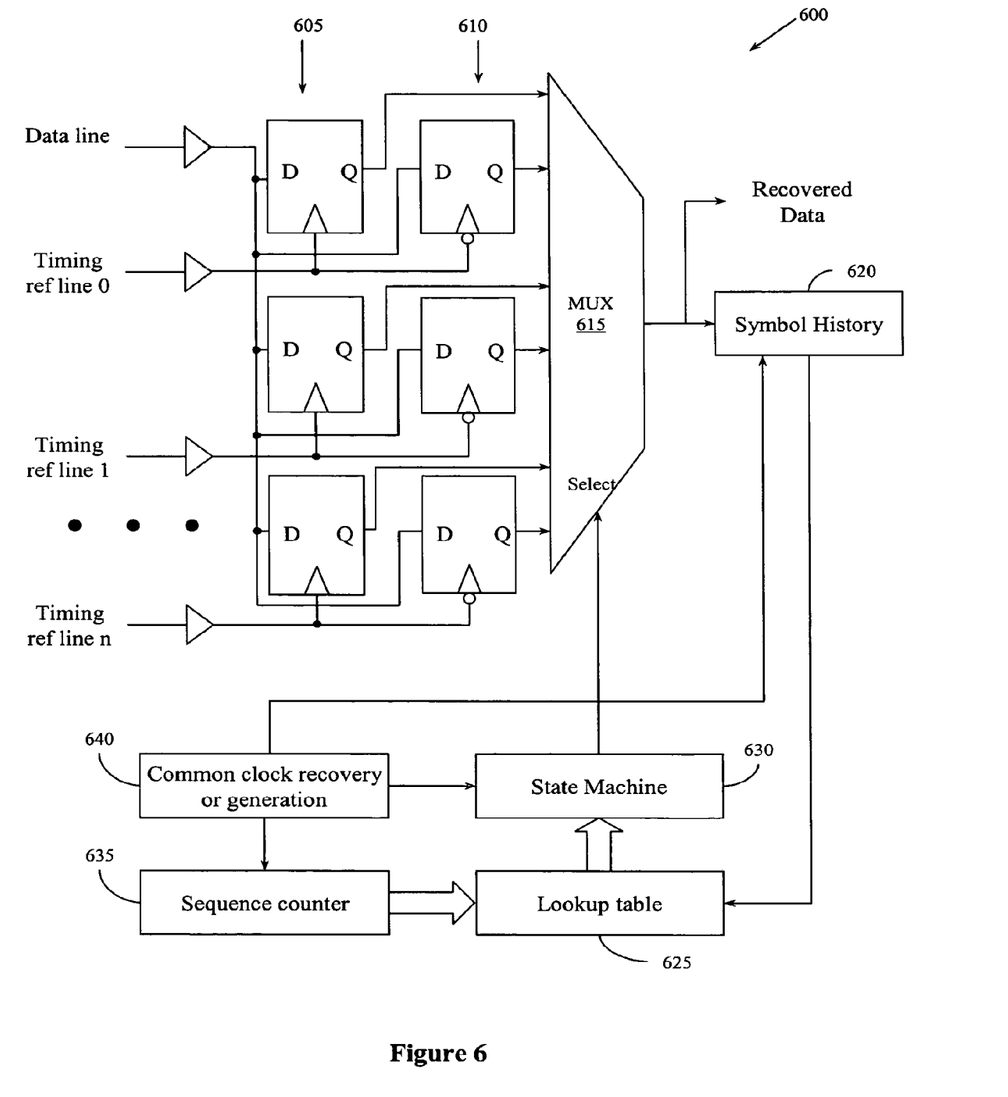
FIG. 6 illustrates an example configuration of a data recovery system.

Illustrated in FIG. 6 is one example of a data recovery system 600 that is configured to recover data from a data line. The data recovery system 600 can provide for inter-symbol interference compensation by using a selected timing reference as a clock source that is based on a symbol history of symbols received on the data line. The data recovery system 600 is configured to concurrently sample each symbol from the data line using each of a set of timing reference lines 0-n. For each timing reference line 0-n, the system 600 can include two registers or latches. One register (shown as a column of registers 605) is configured to sample a symbol from the data line using the timing reference line as a clock signal, and another register or latch (shown as a column of registers 610) is configured to sample the symbol from the data line using an inverted signal of the timing reference line. The concurrently sampled data stored in the registers 605, 610 are controlled by a selector logic such as a multiplexer 615 that is configured to select one sampled data from the set of sampled data. The outputted data from the multiplexer 615 becomes the recovered data to be used by downstream logic.

The system 600 can also include a symbol history logic 620 configured to store a predetermined depth of symbol history. The symbol history logic 620 can be, for example, a shift register or other type of data store. As each new symbol from the data line is recovered, the new symbol is shifted into the symbol history 620 and the oldest symbol can be shifted out. The registers 605, 610 and the multiplexer 615 are one example of a sampling logic that can be used with previously described sampling logics.

The data recovery system 600 can also include a lookup table 625 that is configured to associate the symbol history 620 to a selected timing reference line from the set of timing reference lines 0-n. The lookup table can be implemented as a circuit of other logic. The system 600 may also include a state machine 630, a sequence counter 635, and a common clock recovery or generation logic 640. Using the symbol history 620, the system can match that history in the lookup table 625 in order to select an appropriate timing reference line 0-n. The lookup table 625 outputs a signal to control the multiplexer 615 to recover to next symbol from one register from the group of registers 605, 610.

The state machine 630 can also be configured to control the multiplexer 615. The state machine 630 can be configured to facilitate a mechanism that represents the fact that the exact timing and details of the control of the multiplexer 615 may include more than just a combinatorial function of the symbol history provided by the lookup table 625. In other words, the system might have to choose to switch the multiplexer 615 at the right moment in time during the symbol interval so a synchronous logic may be included in the state machine 630 to control the multiplexer 615. It will be appreciated that the state machine 630 is optional and the control of the multiplexer 615 can be performed by a combinatorial function of the current symbol history 620 and a current interval of the clock sequence.

For example, as previously described with reference to FIG. 3, symbol intervals can be tracked to determine an appropriate association between the symbol history 620 and the symbol patterns on each timing reference line 0-n. The sequence counter 635 can be configured to facilitate this function. The sequence counter 635 keeps track of the sequence of the symbol pattern received on the timing reference lines 0-n so that it coincides with the symbol patterns that are transmitted from a driver. In one example, the sequence counter 635 can be configured to generate the same symbol sequence for each of the timing reference lines 0-n so that it can track the interval of the pattern. In another example, the sequence counter 635 can be a counter that counts the number of intervals in the symbol pattern of the timing reference lines. For example, if each timing reference line has a symbol pattern of four symbols as described in FIG. 3, then the sequence counter 635 can be configured to count between 1-4 to identify which interval the sequence is in. The interval can then be used with the lookup table 625 to identify a matching timing reference line.

The common clock recovery or generation logic 640 can be provided to generate a core clock domain, which is the clock domain that the system 600 is trying to sample the data line into. The generation logic 640 may include phase locked loops connected to the timing reference lines 0-n so that the timing signals can be used as a timing reference (e.g. as a clock). In another example, an asynchronous first in, first out (FIFO) can be used or a ring buffer can be used to provide a mechanism to bridge between a receiver clock domain and the core clock domain. Thus in one example, the clock generation logic 640 can be configured to clock the sequence counter 635 since the clock generation logic 640 can act as the core clock domain.

In one example, data received from a source-synchronous bus can be moved into a core clock domain for the receiving integrated circuit. Techniques for doing this include the use of such circuits as ring buffers, or asynchronous FIFOs, or derive the core clock domain from bus strobes, possibly with a phase locked loop (PLL). The systems and methods described herein can be compatible with these techniques. It will be appreciated that ring buffers, FIFOs, and PLLs that can be used with the system 600 are not illustrated since these components are not necessary to understand the system and they are not shown to minimize the complexity of FIG. 6.

In one example of the data recover system 600, the circuit can assume a pre-existing core clock domain, equal in period to the symbol rate on the data line, and where the core clock domain is generated by the core clock recover logic 640. In another example implementation, the system 600 can replace each of the data recovery registers 605, 610 with a ring buffer. The number of inputs into the multiplexer 615 would be increased to allow it to select from the multiple registers in each ring buffer. The symbol history 620, multiplexer control, and ring buffer control circuits would become multi-domain state machines (i.e. combinatorial functions of smaller state machines in each domain). Additional details of this example implementation are not required to understand of the general configuration of the data recovery system 600, and thus are not included.

It will be appreciated that the system 600 can represent one implementation for one data line and that the system 600 can be replicated for each data line on a data bus. For example, if a parallel data bus has 128 data bits, the system 600 can be replicated 128 times where each system uses the same group of timing reference lines from which one line is selected and used as the clock. If the system 600 is implemented to contain six timing reference lines, a parallel data bus would be configured with an additional six lines to carry the predetermined symbol patterns for each reference line. However, since each data line may have a different symbol history, the data recovery system 600 can be replicated for each data line in order to recover data based on its symbol history.

Figure 7:
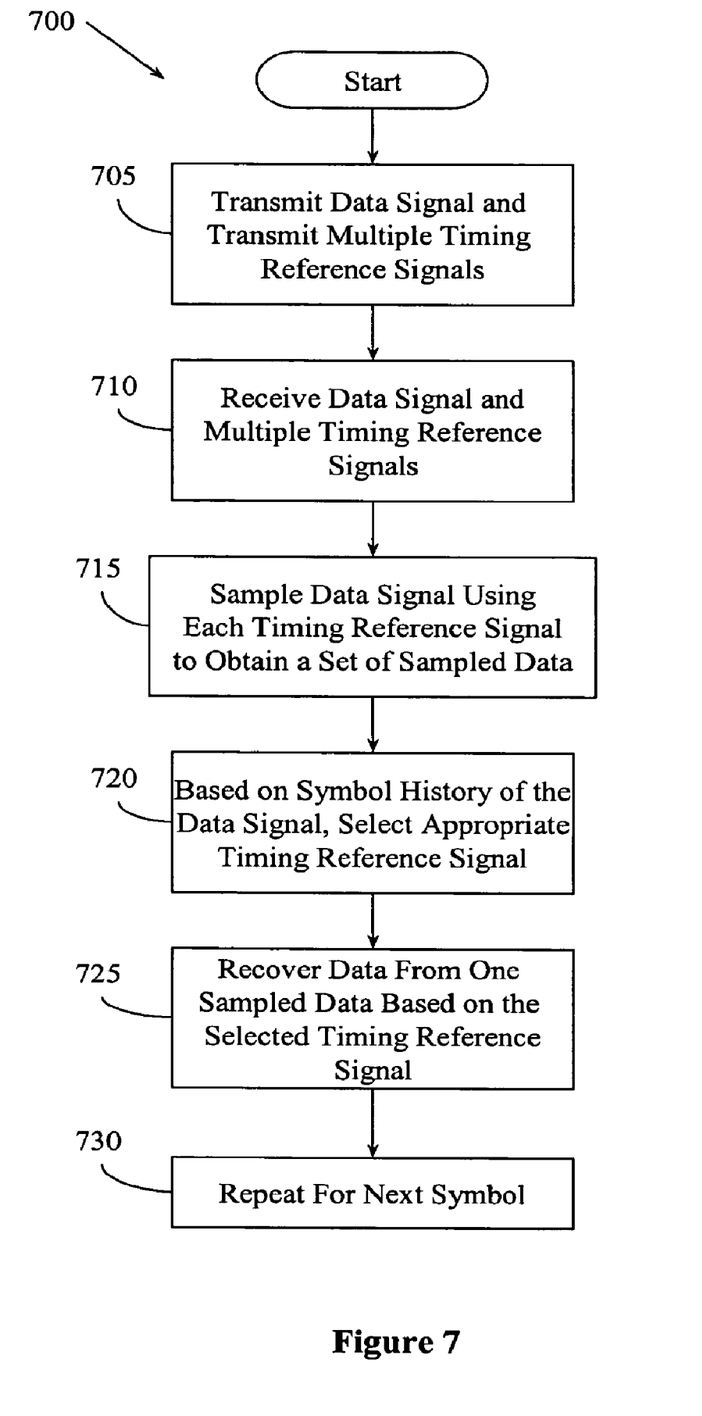
FIG. 7 illustrates an example methodology that may be associated with the system of FIG. 6.

Illustrated in FIG. 7 is another example methodology 700 that can be associated with communicating symbols between a transmitter and a receiver where inter-symbol interference can be compensated for by using a dynamically selected timing reference based on a symbol history. In one example, the receiver can include the data recovery system 600 as shown in FIG. 6.

The methodology 700 can initiate by transmitting a data signal and transmitting multiple timing reference signals (block 705). The data signal and the multiple timing reference signals can be received (block 710). The data signal (e.g. one symbol) is sampled concurrently with each timing reference signal to obtain a set of sampled data. Based on a symbol history of the data signal, an appropriate timing reference signal is selected (block 720). In one example, as previously described, the selection can be based on matching the current symbol history with symbol patterns from the multiple timing reference signals and where the timing reference signal changes or transitions its symbol pattern in the next symbol interval. Based on the selected timing reference signal, data is recovered from one sampled data from the set of sampled data (block 725). The process can then be repeated for the next symbol on the data signal (block 730). Since the data signal and the selected timing reference signal have identical symbol histories, any inter-symbol interference effects should be identical in both signals. Thus, their relative timing is unaltered by the inter-symbol interference.

Figure 8:
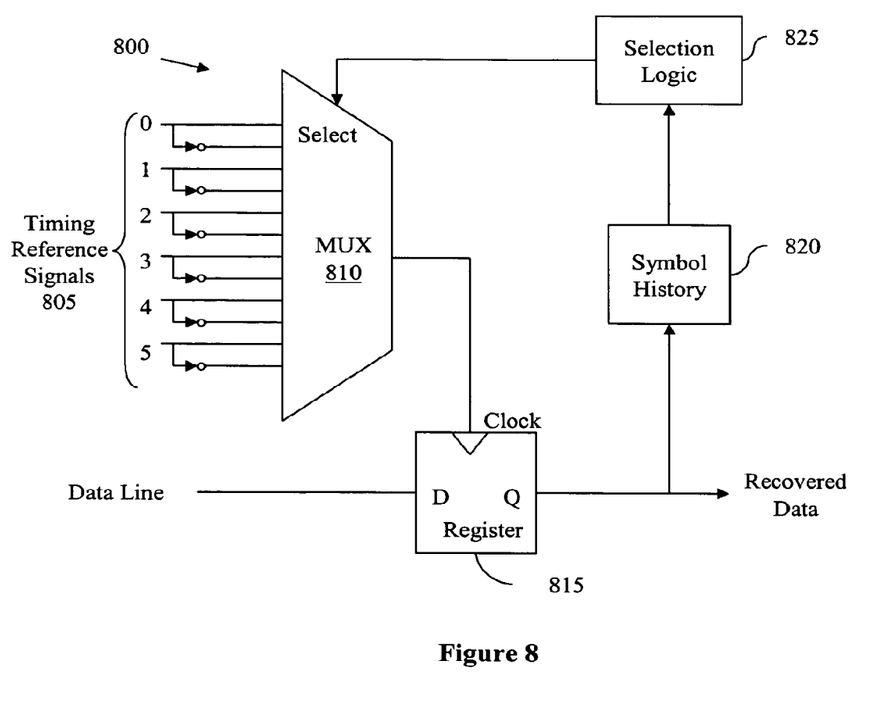
FIG. 8 illustrates another example configuration of a data recovery system.

Illustrated in FIG. 8 is another example of a data recovery system 800 that is configured to sample data (e.g. a symbol) from a data line using one selected timing reference signal from a set of timing reference signals 805. A difference between the data recovery system 800 and the system 600 shown in FIG. 6 is that the system 600 concurrently samples the data using all of the timing reference lines whereas the system 800 samples the data with only one timing reference line.

For example, a multiplexer 810 can be configured to select a timing reference signal that is used to clock a buffer like register 815 that samples a symbol on the data line. The multiplexer 810 and register 815 can be an example sampling logic. The data from the register 815 becomes the recovered data that can be used in a downstream circuit or logic. The register 815 may also be a latch, one or more ring buffers, or other type of buffering mechanism. Similar to previous examples, a symbol history 820 is tracked based on a predetermined symbol history depth. A selection logic 825 can be configured to control the multiplexer in a similar manner as described with previous selection logics. For example, the selection logic 825 can be configured to associate the symbol history 820 with an appropriate timing reference signal based on a matching symbol pattern and a transitioning symbol as the next symbol in the pattern. The timing reference signals 805 may also include their inverse signals as shown in FIG. 8.

Figure 9:
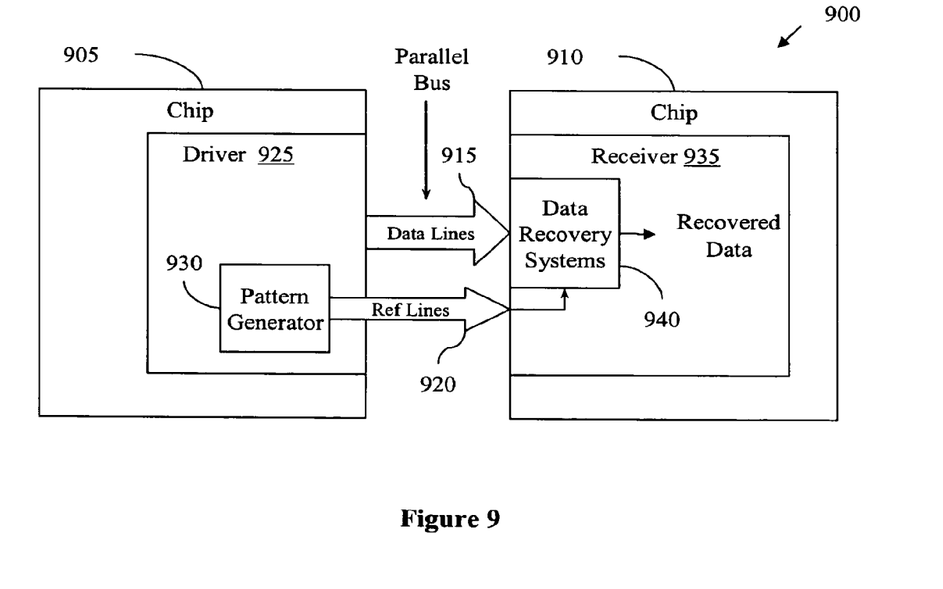
FIG. 9 illustrates an example communication system that can be associated with a data recovery system.

Illustrated in FIG. 9 is an example communication system 900 for communicating data between a chip 905 and a chip 910. The chips 905, 910 may be part of a computing device and may be part of a processor. It will be appreciated that the chips 905 and 910 can generically represent any type of logic, computer component, or circuit that may be in an electronic device. The chips 905 and 910 can be operably connected by a parallel bus that may be single-ended and use a source-synchronous clock or strobe. The parallel bus can include multiple data lines 915 and a set of timing reference lines 920 as previously described.

The chip 905 is configured with a driver or transmitter logic 925 that transmits data onto the data lines 915. A pattern generator 930 can be provided that is configured to generate and transmit a predefined symbol pattern on each of the timing reference lines 920 as previously described. The chip 910 is configured to receive data from the chip 905 and the known timing reference signals 920 via a receiver logic 935. The receiver logic 935 is configured with a data recovery system 940 that can be implemented using any of the previously described data recovery systems or their equivalents to sample and recover the data on the data lines 915 using a dynamically selected line from the timing reference lines 920. A separate data recovery system 940 is used for each data line 915 and each data line is sampled using one of the timing reference lines 920 as a clock source.

For example, in addition to driving single-ended data on each of the data signal lines 915 of the parallel bus, the driver 925 is also configured to drive a known sequence of symbols on the timing reference signal lines 920. The symbol sequence on the timing reference lines 920 is deterministic, using a sequence also known to the receiver 935. In any given symbol period, the receiver 935 knows not only the symbol history of each of its data signals, but also the symbol history and next expected symbol for each of the timing reference signals. Based on the symbol history of a selected data line from all the data lines 915, the data recovery system 940 can select one of the timing reference signals 920 to be a clock source for sampling the selected data line as previously described.

Instead of the parallel bus using a strobe or clock signal to provide a timing reference for the data signals, the system 900 is configured with the set of timing reference signals 920. The reference signals 920 should be electrically identical to the data signals on the data lines 915, sharing the same driver and receiver design, routing topology, termination, and so on. For single-ended data signaling, the corresponding timing reference signals 920 are also single ended.

As previously described, the required number of the timing reference signals 920 is a function of the desired symbol history depth for which compensation of inter-symbol interference is desired, and can also be a function of the electrical and topological symmetry of the design. If the electrical properties of the driver 925, receiver 935, transmission medium, and termination are such that complimentary symbol sequences (i.e. all symbols in the symbol history are inverted) can be assumed to have identical interference effects, then the number of required timing reference signals can be halved. In another example, the system 900 can be configured where no such symmetry can be assumed. The foregoing considerations can be applied to the other example configurations described herein.

Figure 10:
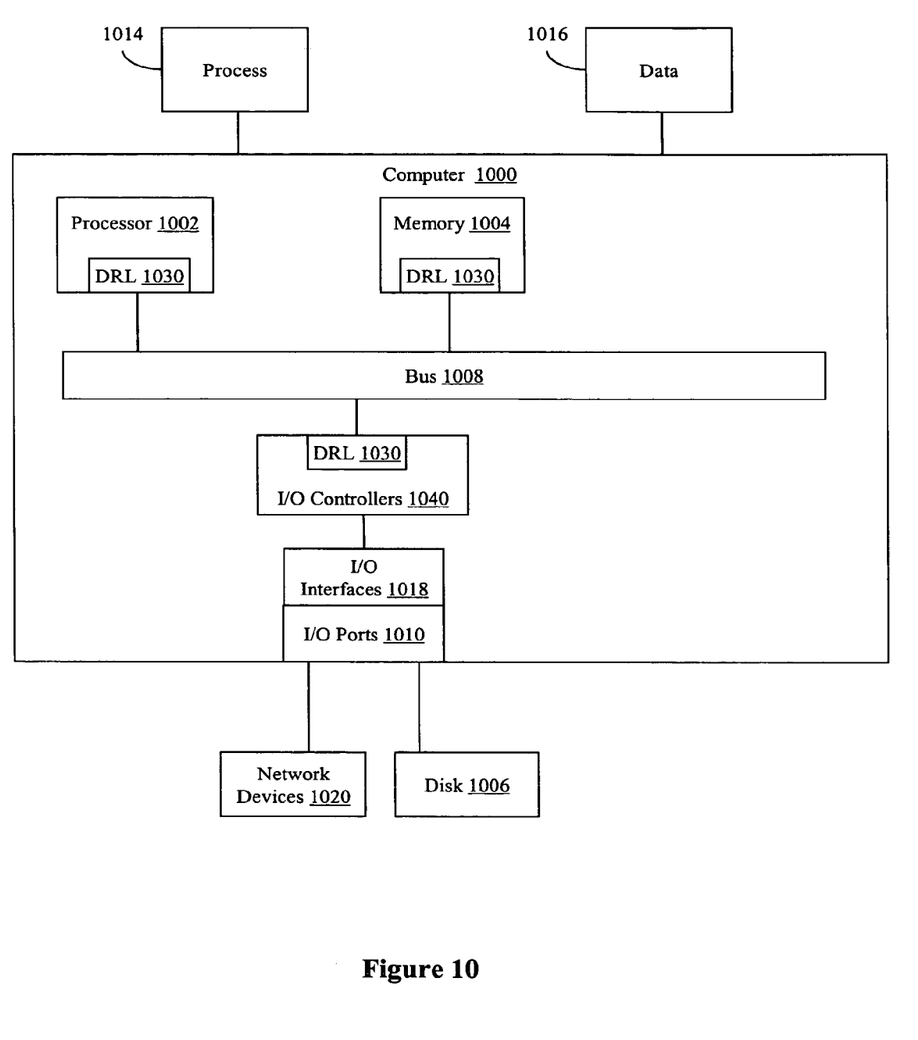
FIG. 10 illustrates an example computing environment in which example systems and methods illustrated herein can operate.

FIG. 10 illustrates an example electronic device in which example systems and methods described herein, and equivalents, can operate. The example electronic device may be a computer 1000 that includes a processor 1002, a memory 1004, and input/output ports 1010 operably connected by a bus 1008. In one example, the computer 1000 may include one or more data recovery logics 1030 configured to facilitate receiving and recovering data from a data line based on a symbol history. The data recovery logic (DRL) 1030 can be implemented similar to the data recovery systems 100, 600, 800 described in FIGS. 1, 6, and 8, respectively, and/or the other systems and methods described herein. The data recovery logic (DRL) 1030 can be operably connected to or embedded within desired components of the computer 1000 such as the processor 1002 and the memory 1004. It will be appreciated that a component can be a driver of data, a receiver, or both and a combination of a driver and a receiver can represent a communication system like communication system 900 described with reference to FIG. 9.

Generally describing an example configuration of the computer 1000, the processor 1002 can be a variety of various processors including dual microprocessor and other multiprocessor architectures. The memory 1004 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 1006 may be operably connected to the computer 1000 via, for example, an input/output interface (e.g., card, device) 1018 and an input/output port 1010. The disk 1006 can include, but is not limited to, devices like a magnetic disk drive, a solid state disk drive, a floppy disk drive, a tape drive, a Zip drive, a flash memory card, and/or a memory stick. Furthermore, the disk 1006 can include optical drives like a CD-ROM, a CD recordable drive (CD-R drive), a CD rewriteable drive (CD-RW drive), and/or a digital video ROM drive (DVD ROM). The memory 1004 can store processes 1014 and/or data 1016, for example. The disk 1006 and/or memory 1004 can store an operating system that controls and allocates resources of the computer 1000.

The bus 1008 can be a single internal bus interconnect architecture and/or other bus or mesh architectures. While a single bus is illustrated, it is to be appreciated that computer 1000 may communicate with various devices, logics, and peripherals using other busses that are not illustrated (e.g., PCIE, SATA, Infiniband, 1394, USB, Ethernet). The bus 1008 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 1000 may interact with input/output devices via i/o interfaces 1018 and input/output ports 1010. Input/output devices can include, but are not limited to, a keyboard, a microphone, a pointing and selection device, cameras, video cards, displays, disk 1006, network devices 1020, and the like. The input/output ports 1010 can include but are not limited to, serial ports, parallel ports, and USB ports.

The computer 1000 can operate in a network environment and thus may be connected to network devices 1020 via the i/o devices 1018, and/or the i/o ports 1010. Through the network devices 1020, the computer 1000 may interact with a network. Through the network, the computer 1000 may be logically connected to remote computers. The networks with which the computer 1000 may interact include, but are not limited to, a local area network (LAN), a wide area network (WAN), and other networks. The network devices 1020 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 1020 can connect to WAN technologies including, but not limited to, point to point links, circuit switching networks like integrated services digital networks (ISDN), packet switching networks, and digital subscriber lines (DSL).

With the examples described herein, systems and methods can be provided that, for example, do not rely on theoretical prediction of the signal behavior. They can derive timing from actual in-circuit behavior of a reference signal, carrying the identical symbol sequence as the data being sampled. One effect of the described systems and methods can be to compensate for inter-symbol interference using dynamically selected timing references.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A data recovery system, comprising:
   a plurality of timing reference lines where each timing reference line is configured to carry a timing reference signal having a different predetermined symbol pattern;
   a sampling logic configured to sample data from a data line using a timing reference that is selectable from the plurality of timing reference lines;
   a symbol history logic configured to track a symbol history of the data sampled by the sampling logic; and
   a timing selection logic configured to select the timing reference from the plurality of timing reference lines used to sample the data where the selected timing reference includes a symbol pattern that matches the symbol history of the data to compensate for inter-symbol interference.

2. The system of claim 1 where a number of the plurality of timing reference lines is based on a depth of the symbol history to be tracked.

3. The system of claim 1 where the timing selection logic includes a look-up table pro-configured to associate symbol histories of data to a timing reference signal.

4. The system of claim 3 where a symbol history in the look-up table is associated to a timing reference signal that has an identical symbol history and a changing symbol on a next symbol interval.

5. The system of claim 3 where, based on a symbol history depth of two symbols, the look-up table is configured with four possible symbol histories that are each associated to one of six timing reference signals, each of the six timing reference signals being defined with a symbol pattern.

6. The system of claim 1 where the sampling logic is configured to concurrently sample the data line with each of the plurality of timing reference signals, and includes a multiplexer configured to select one of the concurrently sampled data based on a signal from the timing selection logic.

7. The system of claim 1 where the sampling logic includes a multiplexer that controls selection of the plurality of timing reference signals and where a selected timing reference signal controls a clock of a buffer configured to sample the data line.

8. The system of claim 1 where the timing selection logic is configured to select the timing reference for each symbol received on the data line.

9. The system of claim 1 where the timing selection logic is configured to select the timing reference that includes an identical symbol pattern as the symbol history of the data sampled and includes a changing symbol as a next symbol in the predetermined symbol pattern.

10. The system of claim 1 where the sampling logic includes one of: one or more registers to latch the data or one or more ring buffers to latch the data.

11. The system of claim 1 where the data recovery system is integrated into a processor chip.

12. An electronic device, comprising:
    a processor for processing signals;
    a memory for storing signals that can be processed by the processor;
    a plurality of logic devices configured to communicate between each other including:
       a driver configured to transmit signals to a receiver on a parallel data bus having a plurality of data lines, each data line having an associated set of timing reference lines;
       the driver including a pattern generator configured to repetitively generate a predefined signal pattern for each of the timing reference lines;
       a receiver configured to receive the signals on the parallel data bus where the receiver includes for each data line:
          a symbol history logic configured to store a symbol history of the signals received on the data line;
          a sampling logic configured to sample data from the data line based on one timing reference line from the set of timing reference lines; and
          a selection logic configured to select the one timing reference line where the one timing reference line has signal sequence having a signal history that matches the symbol history of the data line and has a transition in a next signal in the predefined signal pattern.

13. The electronic device of claim 12 where selection logic selects the one timing reference line to sample the data where the one time reference provides a clock signal that compensates for inter-symbol interference.

14. A method, comprising:
    transmitting a data signal and multiple timing reference signals, each of the multiple timing reference signals carrying a repeating symbol pattern;
    receiving the data signal and the multiple timing reference signals;
    sampling the data signal using each of the multiple timing reference signals to obtain a set of sampled data;
    selecting one timing reference signal from the multiple timing reference signals based on an association between a symbol history of the data signal and the symbol pattern of the one timing reference signal; and
    recovering a symbol from the data signal using the one timing reference signal selected.

15. The method of claim 14 where the method is repeated for each symbol of the data signal.

16. The method of claim 14 further including compensating for Inter-symbol interference when recovering the symbol due to the symbol pattern of the one timing reference signal selected.

17. A system, comprising:
a plurality of timing reference lines where each timing reference line is configured to carry a different symbol pattern that is a timing reference signal;
a sampling means for sampling data from, a data line using a timing reference that Is selectable from the plurality of timing reference signals;
a tracking means for tracking a symbol history of the data sampled by the sampling logic; and
a selecting means for selecting the timing reference line used to sample the data by the sampling means, the selecting being based on matching the symbol history of the data with a symbol pattern from the timing reference line.

18. The system of claim 17 where the sampling means being configured to concurrently sample the data from the data line using each of the plurality of timing reference signals to obtain a plurality of sampled data.

19. The system of claim 18 where the selecting means being configured to select one sampled data from the plurality of sampled data based on the selected timing reference.

20. The system of claim 17 where the selecting means associates possible symbol histories to timing reference signals.

21. The system of claim 17 where the system is one of: a processor chip or a computing device.

22. The system of claim 17 further including a parallel bus that includes a plurality of data lines and a timing reference line for each of the plurality of timing reference signals, the parallel bus being operably connected to the sampling means.

23. The system of claim 17 where the plurality of timing reference lines are each configured to carry a predetermined signal pattern where a combination of each predetermined signal pattern at a selected interval includes signal histories that match possible symbol histories based on a depth of the symbol history being tracked.

24. The system of claim 17 where the system is a data recovery means for recovering data from the data line.

* * * * *

UNITED STATES PATENT AND TRADEMARK OFFICE
CERTIFICATE OF CORRECTION

PATENT NO.        : 7,447,971 B2
APPLICATION NO. : 11/089578
DATED             : November 4, 2008
INVENTOR(S)       : Derek Alan Sherlock Page 1 of 1

It is certified that error appears in the above-identified patent and that said Letters Patent is hereby corrected as shown below:

In column 6, line 55, delete "data l" and insert -- data 1 --, therefor.

In column 13, line 55, in Claim 3, delete "pro-configured" and insert -- pre-configured --, therefor.

In column 15, line 2, in Claim 16, delete "Inter-symbol" and insert -- inter-symbol --, therefor.

In column 15, line 9, in Claim 17, after "from" delete ",".

In column 15, line 10, in Claim 17, delete "Is" and insert -- is --, therefor.

Signed and Sealed this

Twenty-sixth Day of May, 2009

JOHN DOLL
*Acting Director of the United States Patent and Trademark Office*